United States Patent Office 3,446,771
Patented May 27, 1969

3,446,771
PROCESS FOR THE PRODUCTION OF POLYURETHANE ELASTOMER
Kanji Matsubayashi and Takuo Kawaguchi, Kurashiki, Japan, assignors to Kurashiki Rayon Co., Ltd., Kurashiki, Japan
No Drawing. Filed Feb. 21, 1967, Ser. No. 617,511
Claims priority, application Japan, Mar. 8, 1966, 41/14,455; May 20, 1966, 41/32,411
Int. Cl. C08g 53/14, 22/04
U.S. Cl. 260—45.85     7 Claims

ABSTRACT OF THE DISCLOSURE

A high molecular weight diol having a molecular weight of about 400 to about 8,000, a low molecular weight diol having a molecular weight of 62 to about 400, and an organic diisocyanate is polymerized by the one step process in a mixing blender provided a crushing means and in the presence of 5 to 60% by weight based on the total ingredients of an amide compound selected from the group consisting of dialkylformamide, dialkylacetamide, N-alkyl-pyrrolidone, N-alkyl-piperidone, and N-alkyl-caprolactam. The temperature of the polymerization is regulated at the range of a room temperature to 100° C. The mechanical mixing is continued from the beginning of the polymerization to after the time when the solid polyurethane elastomer is produced. The resultant solid polyurethane elastomer is crushed continuously by the crushing means into the pulverized form.

---

The present invention relates to a method of manufacturing pulverized polyurethane elastomers by polymerizing a high molecular weight diol having a molecular weight of about 400 to about 8,000 and terminal hydroxyl groups (hereinafter referred to as "high molecular diol"), a low molecular weight diol having a molecular weight of 62 to about 400 (hereinafter referred to as "low molecular diol"), and an organic diisocyanate (hereinafter referred to as "diisocyanate") by one step process while mixing and crushing said three components, characterized in that an amide compound is allowed to be present during the polymerization reaction in an amount of 5 to 60% by weight of the total weight of said three components and the amide compound.

It is an object of the present invention to provide pulverized polyurethane elastomers which have homogeneous composition, contain a small amount of oligomers and by-products insoluble in solvents, and have sharp molecular weight distribution. Firstly, pulverized polyurethane elastomers have long storage life and are easily handled in transportation. Furthermore, all the pulverized elastomers manufactured by the method of the invention have good solubility in solvents, e.g. dimethylformamide. In particular, the pulverized elastomers according to the invention which retain the amide compound used in the polymerization give remarkably homogeneous solutions free from insoluble portions, which undergo little change in viscosity and stable and transparent. Accordingly, from the solutions, filaments, fibres, films, coatings, synthetic leathers and other shaped articles which are uniform in physical and chemical properties can be obtained.

Another object of the invention is to provide the manufacture of polyurethane elastomers without the use of catalysts such as tertiary amines or organic tin compounds which have hitherto been employed in the polymerization reaction of polyurethane elastomers. However, the tertiary amines or organic tin compounds can be used as catalysts in order to shorten the polymerization time and to homogenize the resulting elastomers, but these catalysts also serve as catalysts for the decomposition of the resulting elastomers and, moreover, the removal of these catalysts from the resulting elastomers is difficult. For these reasons, the resulting elastomers containing such catalysts have been used as such in the manufacture of elastic filaments, fibres, films, coatings, synthetic leathers and other shaped articles. As the result, there have been various disadvantages such as drops in the viscosity of the solutions during moulding of those shaped articles, thermal decomposition during moulding of the melted elastomers, and undesirable changes with time of the shaped articles such as colouration and loss of strength and elasticity due to sensitiveness to the attacks by light, oxygen in the air, and other oxidants and alkaline substances encountered after moulding. Since the elastomers manufactured in accordance with the present invention are free from such catalysts, they are seldom subjected to the above mentioned changes during and after shaping. Furthermore, the polymerization time can be shortened to the same extent as that in using the catalysts, and elastomers having uniform quality can be successfully provided by mass production as on the commercial basis.

It has already been known, prior to the present application, for example by British Patent No. 1,002,519, that pulverized polyurethane plastics are manufactured by adding a diisocyanate to the melted mixture of high molecular and low molecular diols and effecting the reaction of said three components in a mixer, e.g. kneader or Werner's mixer. However, the prior art technique has disadvantages. There is a large amount of oligomer in the polyurethane plastics thus prepared, and when a synthetic leather is manufactured by coating non-woven fabrics such as cotton, rayon, nylon or polyester fibres with a solution of the above plastics in dimethyl formamide and by dipping the coated non-woven fabrics in a liquid such as water which is non-solvent to said plastics and said non-woven fabrics and has affinity to dimethylformamide thereby coagulating the coating, or when elastic filaments or films are produced by extruding the solution of said plastics in dimethylformamide through a nozzle or slit into a nonsolvent such as water, the oligomeric content in the plastics is separated. Said oligomers not only mud the coagulating bath but also cause roughing and staining on the surface of the shaped articles, whereby the merchandise values of the products are materially impaired. Further, the weight of the shaped articles is too small as compared with the total weight of plastics used. It means that the weight loss during shaping is unduly large.

As described hereinbefore, the present invention pertains to the manufacture of polyurethane elastomers having only small oligomer contents, and to improvements of prior art processes. It has been known before filing the present application that the amide compounds to be used in the invention are good solvents for polyurethane elastomers. The so-called two-step polymerization process for the manufacture of polyurethane elastomers wherein high molecular diol and diisocyanate are reacted to prepare a prepolymer having free NCO group and then the prepolymer is subjected to chain extending by glycols or diamines in the presence of an amide compound such as dimethylformamide, has also been known. The production of oligomer has been successful restricted only by the present invention through the presence of a predetermined amount of an amide compound in the one-step polymerization system of said three components. In addition, the amide compound to be used in the invention also serves as a catalyst in the polymerization reaction of said three components. As it is completely eliminated after the preparation of said elastomer or after the manufacture of shaped articles, from the solution of said elastomer, the compound invites no such troubles as usually caused by conventional catalysts.

The objects of the present invention as above set out can be achieved by practicing the invention in the following way. First, a high molecular diol, a low molecular diol, and a diisocyanate are introduced into a mixer equipped with a crusher means. Next, an amide compound is added in an amount of 5 to 60% by weight of the total weight of the three components plus the amide compound. Then, while the charge is being mixed and crushed, the polymerization is effected at a reaction temperature controlled at the range between a room temperature to 100° C. The reaction system initially is a liquid form, but as the polymerization proceeds, an amount of solid elastomer is increased and then the resulting elastomer is crushed to pulverized form. When an amount of the amide compound is large, a pulverized elastomer can be formed by decreasing the amount of said compound either after the completion of the polymerization or during the reaction. In such a case, if the mixer is stopped and the operation is interrupted before the resulting elastomer is crushed and the resulting mass is once hardened, it will be impossible to begin the operation of the mixer again and the elastomer will no longer be crushed. It is therefore necessary that the charge of the materials into the reactor, the polymerization and the crushing of the resulting elastomer must be effected continuously.

Preferable amide compounds to be used in the invention are dialkylformamides wherein the alkyl group has 1 to 5 carbon atoms, such as dimethylformamide (hereinafter referred to as "DMF") and diethylformamide; dialkyl acetamides wherein the alkyl group has 1 to 5 carbon atoms, such as dimethylacetamide and diethylacetamide; and other amide compounds having alkyl groups which contain 1 to 5 carbon atoms, such as N-alkyl-pyrrolidone, N-alkyl-piperidone, and N-alkyl-caprolactam, and mixtures thereof. Of these compounds, DMF is most preferable for commercial production because it is available commercially at a low cost.

In the practice of the invention, the larger the amount of the amide compound, the longer the time required for crushing the resulting elastomer. If the amount of the compound is further larger, the elastomer will not be crushed unless the pressure inside the mixer is reduced after the completion of the polymerization reaction or during said reaction and the amount of the amide compound is decreased while continuing the mixing and crushing. Even a small amount of the amide compound can inhibit the production of oligomer in the polyurethane elastomer, but the effect is enhanced with an increase of the amount of said compound. When the amount of the amide compound is small, the resulting elastomer can be crushed within a short period of time, but the pulverized product has no large a grain size and so poor uniformity that the load on the motor of the mixer is increased to an operational disadvantage. Therefore, suitable control of the amount of the amide compound is essential for the practice of the invention. In the light of the foregoing, it is desirable to use an amide compound in an amount ranging from about 5 to about 60% by weight, preferably from 7 to 40% by weight, of the total weight of the three components and the amide compound.

If the polymerization reaction according to the invention is carrier out at an elevated temperature above 100° C., an undesirable phenomenon will develop that the amide compound will react also with the NCO group and will consume the diisocyanate, one of the starting materials The polymerization should therefore be effected at a relatively low temperature. While the velocity of reaction between the amide compound and NCO group is considerably slow as compared with that between the OH group and NCO group, it is advisable in the practice of the invention to consider also the amount of the amide compound and effect the polymerization at a temperature above normal temperature and below 100° C. It should be noted, however, that the limitation of the reaction temperature is not critical but the invention can be also practiced at a temperature above 100° C. by adding the diisocyanate in an amount more than that in which the consumption by the amide compound is compensated.

In practice of the present invention, the high molecular diol, low molecular diol, diisocyanate, and amide compound may be introduced either simultaneously or in succession as the case may be. In actual operation it is advisable to feed the high molecular diol, the low molecular diol and the diisocyanate into a mixer to homogenize the reaction mixture, and the polymerization reaction is carried out at a slow rate, preferably while the mixer is being cooled by coolant in order to avoid overheating of the reactor due to the heat of reaction, and then the amide compound is added thereto, when the reaction mixture converts from liquid to paste form owing to decrease of the amount of unreacted NCO group, and thereafter the polymerization is continued while maintaining the reaction system in a homogeneous state. In the case where a small amount of an amide compound is used in order to facilitate the pulverization of the resulting elastomer, the order for feeding the amide compound as described above decreases the accumulation of the heat of reaction and prevents local increase of temperature in the reaction system thereby the production of any by-product insoluble in solvent which has a three dimensional mechanism can be inhibited and also the load on the motor during the crushing operation can be lowered. This effect is remarkable, when treating the resulting elastomer in a mass production of more than 10 kg. The prevention of increase of temperature in the reaction system extends the time of period until the completion of reaction and a stabilizer such as an acidic substance can be added while the reaction is proceeding.

The desired effects to which the present invention is directed can be achieved more easily by the use of an amide compound in combination with an acidic substance as a stabilizer. Such combined use is particularly effective in inhibiting the production of any solvent-insoluble by-product in the case when the amide compound is allowed to be present from the very beginning of the polymerization for the mass production of the resulting elastomer.

Preferable acidic substances to be used in the invention include inorganic acids, such as hydrogen chloride, sulfuric acid, sulfurous acid, orthophosphoric acid, metaphosphoric acid, phosphorous acid, hypophosphorous acid, iodic acid, periodic acid and selenic acid; organic acids, such as formic acid, acetic acid, monochloroacetic acid, dichloroacetic acid, β-bromopropionic acid, o-(m- or p-)chlorobenzoic acid, oxalic acid, maleic acid, salicylic acid, benzene sulfonic acid, p-toluene-sulfonic acid and 1,5-naphthylene disulfonic acid; phenols and phenol derivatives, such as phenol and o-(m- or p-)cresol; halogenated phenols, such as o-(m- or p-)chlorophenol, dichlorophenol, trichlorophenol, and trichlorofluoroglycynol; acid anhydrides, such as fulfuric anhydride, sulfurous anhydride, phosphorous pentoxide, acetic anhydride, monochloroacetic anhydride, maleic anhydride and p-toluene-sulfonic anhydride; and acid chlorides, such as thionyl chloride; sulfuryl chloride, phosphorous oxytrichloride, boron trifluoride, acetyl chloride, α-chloroacetyl chloride, oxalyl chloride, benzene sulfochloride and p-toluene sulfochloride.

These acidic substances may be used in an amount of 0.01 to 30% by weight, preferably of 0.1 to 10% by weight, of the total weight of the three components of the starting materials.

When using polyester glycol as the high molecular diol, if a strong acid, e.g. hydrogen chloride or sulfuric acid is used, said acid causes exchange reaction of ester bond with the low molecular diol, so that it is impossible to manufacture polyurethane elastomer having a high polymerization degree. In such a case, it is desirable to use a weak acidic substance, such as phenols or hydrogenated phenols.

When the invention is put into practice under the foregoing conditions, a desired pulverized polyurethane elastomer can be manufactured in a period of 10 minutes to about 20 hours. Such a necessary time is influenced depending upon the reaction temperature, content of amide compound, types of the three starting materials, and the scale of production.

In the practice, the invention is characterized by mixing and crushing of the reaction system. For this purpose a variety of mixers may be used, for example a mixer equipped with a crushing means such as kneader or Werner's mixer.

As the high molecular diols having a molecular weight in the range of about 400 to about 8,000 and terminal hydroxyl groups, polyester glycols, polyether glycols and polyester ether glycols are preferable. Also, polyacetal glycols, polyoxysilanes and mixtures thereof may be used. As polyester glycols, use may be made of ones obtained by polycondensation of aliphatic dicarboxylic acids such as adipic acid and sebacinic acid with aliphatic or cyclo-aliphatic glycols such as ethylene glycol, propylene glycol, butylene glycol, pentamethylene glycol, hexamethylene glycol and hexane-dimethanol, or polycaprolactone, obtained by ring opening polymerization of lactones. As polyether glycols, polyalkylene glycols, such as polyethylene glycols, polypropylene glycol and polytetramethylene glycol (polybutylene glycol) are preferable. As polyester glycols, use may be made of products obtained by polycondensation of aliphatic dibasic acids, such as adipic acid, sebacinic acid and succinic acid with ether glycols, such as diethylene glycol, triethylene glycol, tetraethylene glycol and hexamethylene glycol.

Useful low molecular diols having a molecular weight ranging from 62 to about 400 include various alkylene glycols such as ethylene glycol, propylene glycol, butylene glycol, pentamethylene glycol and hexamethylene glycol, diethylene glycol, tetraethylene glycol, trimethylol propane, hexane triol, dioxyphenyl alkane, phenylene bis(hydroxy ethyl ether) or short chain polyesters such as low molecular weight polyethylene terephthalate.

Suitable organic diisocyanates are aromatic diisocyanates, such as naphthylene diisocyanate, 4,4'-diphenylmethane diisocyanate, diphenyl diisocyanate, 2,4-(or 2,6-)toluylene diisocyanate, phenylene diisocyanate and diphenyl ether diisocyanate. Aliphatic diisocyanates, such as hexamethylene diisocyanate may also be used.

In the practice of the invention, the three starting materials can be charged into the reactor in a mixing ratio of the NCO groups in the organic diisocyanate to OH groups in the diols of 1.5 to 0.8. In the case when the resulting elastomer is used in the manufacture of elastic filaments or fibres, the ratio of the NCO groups to OH groups should be approximately 1.0, because the molecules of said elastomer must principally have linear structures and the molecular weight must be high. On the other hand, when the resulting elastomer is employed in the production of films, coatings, adhesives, synthetic leathers and other shaped articles, the molecules must not always possess such linear structures. It is therefore possible to polymerize the elastomer in such a manner that the NCO groups or OH groups may be excessive and then to cure the resulting product by heat or by the action of a curing agent. Thus, the mixing ratio of these three materials can be freely chosen in a fairly broad range. However, in cases where polyester glycols having a molecular weight of about 2,000 are used as the high molecular diols and alkylene glycols are used as the low molecular diols, it is advisable to adjust the ratio of the number of OH groups in the polyester glycol: number of OH groups in the alkylene glycol: number of NCO groups in the organic diisocyanate to approximately 1:4:5. Such mixing ratio is beneficial in the production of polyurethane elastomers adapted for a wide variety of applications such as elastic filaments, fibres, films, synthetic leathers, and coatings.

The present invention is illustrated by the following examples.

EXAMPLE 1

A Werner's blender having a capacity of 5 lit. was charged with 258 g. of polybutylene adipate having an OH value of 110.5 and acid value of 0.3, 158 g. of solid 4,4'-diphenylmethane diisocyanate, 46.7 g. of 1,4-butane diol and 47 g. of dimethylformamide (hereinafter referred to as "DMF"). Hot water at 50° C. was flown through the jacket around the blender, and mixing was continued. About 70 minutes after the charging, the reaction product was pulverized. The hot water in the jacket was raised to 75° C. while continuing the stirring and the blender was kept under a reduced pressure of 30 mm. Hg for five hours to remove DMF. The pulverized polyurethane resin thus obtained had an intrinsic viscosity $[\eta]$ (at 80° C., in DMF, the same conditions being applicable hereinafter) of 0.92. When it was shaped into a belt as a melt-moulding material, it exhibited a very small loss of the polymerization degree.

EXAMPLE 2

A Werner's blender with a capacity of 35 lit. was charged with 2,900 g. of polycaprolactone having a molecular weight of 1,450 and terminal hydroxyl groups, 1,800 g. of 4,4'-diphenylmethane diisocyanate, 309 g. of ethylene glycol, and 600 g. of N-methyl-2-pyrrolidone. Water at 40° C. was circulated, through the jacket around the blender, the charge was mixed. Gradually the reaction product became viscous and began to be pulverized in about 90 minutes. As the mixing was continued for a further period of 2.5 hours, a pulverized polyurethane resin containing the solvent and having an intrinsic viscosity $[\eta]$ of 0.87 was obtained. One hundred parts of the solvent-containing pulverized polyurethane resin was mixed with 660 parts of DMF at 50° C. to prepare a solution of the polyurethane resin in DMF. On the other hand, staple fibres having cut length of 4.5 cm. and fineness of 3.0 to 3.2 deniers obtained by melt spinning of Nylon-6 chips were formed into non-woven cloth having a thickness of 0.5 cm. and web weight of 200 g./m.$^2$, and the cloth was impregnated with the polyurethane solution prepared as above at 50° C. for 30 minutes. Next, the impregnated cloth was dipped in a bath consisting of 50 parts of DMF and 50 parts of water at 50° C. for 60 minutes and thoroughly coagulated. The resulting cloth was then washed with water to eliminate DMF, and was wound on a hot roller at 150° C. in contact with said roller for 10 minutes to produce a synthetic leather.

The loss of the polyurethane resin in the course of the coagulation, when producing synthetic leather by using polyurethane resin obtained by the method of the invention and the tearing strength of the resulting synthetic leather are shown in the table below. As a contrast the starting materials having the same composition as above were mixed and melted at 100° C. and polymerized with heat on a hot plate at 145° C. for 5 hours, and the resulting polyurethane resin having an intrinsic viscosity $[\eta]$ of 0.92 was processed into a synthetic leather in the same manner as above. The values of the contrast are also given in the following table.

|  | Loss of polyurethane resin (percent) | Tearing strength (kg.) |
|---|---|---|
| This invention | 0.1 | 4.0 x 5.1 |
| Contrast | 6.2 | 3.7 x 3.6 |

As seen from the above table, when the polyurethane resin obtained by the method of the invention is employed, the loss of the resin in the course of coagulation is small and the separation of oligomer which represents the resin lost is practically negligible in the operation.

EXAMPLE 3

A Werner's blender having a capacity of 5 lit. was charged with 630 g. of polytetramethylene glycol having a molecular weight of 1,050 and terminal hydroxyl groups, 600 g. of 4,4'-diphenylmethane diisocyanate, 108 g. of 1,4-butane diol, and 150 g. of DMF. When the charge was maintained at 45° C. and mixed for 5 hours, and then the temperature was gradually increased to 75° C. and the stirring was continued under a reduced pressure of 25 mm. Hg, the product was pulverized. As the operation was continued for a further period of 6 hours, a pulverized polyurethane resin having a DMF content of 0.1% was formed. The resin was melted at 180° C. and shaped into a moulding, which was no longer soluble in solvent such as DMF and has excellent resistances to solvent and abrasion and strength property.

EXAMPLE 4

A kneader having a capacity of 15 lit. was charged with 1,800 g. of polyethylene adipate having an OH value of 55.5 and an acid value of 0.4, 1,124 g. of 4,4'-diphenylmethane diisocyanate 223 g. of ethylene glycol and 351 g. of DMF. Water at 45° C. was circulated through the jacket around the kneader. When the charge was mixed and pulverized for about 20 minutes, the pulverized product was formed. When the mixing was continued for about 5 hours, a DMF-containing pulverized polyurethane resin was obtained. The pulverized resin was dissolved in an additional amount of DMF to prepare a solution of 10% concentration having a viscosity of 2.5 poises. The solution was flown on a plate glass so as to form a film of a thickness of 1.5 mm., and the assembly was dipped in water at 80° C. for 30 minutes to form a polyurethane film. The loss of polyurethane resin in the course of coagulation was shown in the table below. A charge of the same composition except having no solvent and the same mixing ratio as those of the invention was melted and mixed at 100° C. and flown on a hot plate at 145° C. and shaped into a form of sheet and heated for 5 hours. A film (Contrast 1) was obtained in the same way as above from a 10% solution of the polyurethane resin in DMF having a viscosity of 2.5 poises. Also, a charge of the same composition and the same mixing ratio as above described except that toluene was used instead of DMF as the solvent was polymerized in a Werner's blender at a temperature of 100° C., the solvent was eliminated, and then a film (Contrast 2) was obtained in the same way as above from a 10% solution of the resulting pulverized polyurethane resin in DMF having a viscosity of 2.5 poises. The values of these contrasts representing the losses of polyurethane resins in the coagulation are also given in the following table for comparison.

|  | Loss of polyurethane resin during coagulation (percent) |
|---|---|
| This invention | 0.4 |
| Contrast 1 | 8.7 |
| Contrast 2 | 12.3 |

As seen from the above table, when the polyurethane resin obtained by the method of the invention is used, the loss of the resin solution in the coagulation is obviously less than that observed in polyurethane resins prepared by other methods. The lost resin is higher in nitrogen content than the other polyurethane resin according to nitrogen analysis and has an intrinsic viscosity as low as about 0.2 and is so-called "oligomer containing a large amount of hard segment." In production of film, when films were stripped after coagulation, emulsified precipitate was separated between the coagulated film layer and plate glass, in case of polyurethane resin containing a large amount of oligomers, while the emulsified precipitate was not substantially formed, when using the polymer obtained by the method of the present invention.

EXAMPLE 5

A kneader having a capacity of 15 lit. was charged with 1,250 g. of the same polybutylene adipate as used in Example 1, 793 g. of metaphenylene diisocyanate, 169 g. of 1,4-butane diol, and 824 g. of dimethylacetamide and the resulting mixture was stirred while keeping temperature at 50° C. The pulverized product began to be formed in about 15 minutes. The stirring was continued under such a condition for a further period of 3 hours. To the pulverized dimethylacetamide containing polyurethane resin thus obtained, dimethylacetamide was added to prepare a polymer solution having a concentration of 20% and a viscosity of 92 poises. The solution was spun through a nozzle having 10 holes into a coagulation bath of water. The elastic yarns obtained upon drying exhibited the following properties. The tenacity of the yarns was 0.85 g./d., ultimate elongation was 490%, and the elastic recovery after stretched 100% for 1 minute and then left to stand for 1 minute was 95%. Loss of the polyurethane resin in the coagulation for spinning was very small.

EXAMPLE 6

1,400 parts of polybutylene adipate having an OH value of 54.8 and an acid value of 0.2, 172 parts of ethylene glycol, 437 parts of dimethylformamide and 5 parts of trichlorophenol were charged in a kneader and mixed at 95° C., and then 902 parts of solid 4,4'-diphenylmethane diisocyanate were added thereto. When the mixing was continued at the same temperature, the reaction product expanded upward in 5 minutes and began to be crushed in 30 minutes. After heating for a further period of 2 hours, a finely pulverized polyurethane elastomer resin containing dimethylformamide was obtained. The resin was dissolved in an additional amount of dimethylformamide to obtain the polymer solution having a concentration of 30%, which was colourless and transparent and had a viscosity of 1,250 poises and gave upon dry spinning elastic yarns having a tenacity of 1.2 g./d. and an elongation of 490%. Urethane resin obtained by the same polymerization as above described but without the use of trichlorophenol was apparently same as the above product but the polymer solution having a concentration of 30% was muddy and exhibited poor filter-ability for dry spinning and failed to give elastic fibres. The muddy polymer solution was further diluted with dimethylformamide to prepare a solution of a concentration of 2.5%, and when the muddy content was centrifugally extracted from said solution. The extract accounted for 3.5% by weight of the total amount of the polymer. It was no longer soluble in dimethylformamide but was merely swollen in the solvent.

EXAMPLE 7

720 kg. of solid polytetramethylene glycol having a molecular weight of 1,200, 180 kg. of 1,4-butane diol, 3 kg. of formic acid, 763 kg. of solid 4,4'-diphenylmethane diisocyanate and 590 kg. of dimethylacetamide were charged, in the order mentioned, into a Werner's Blender having a capacity of 5 m.³. When the resulting mixture was stirred, the viscosity of the product was increased in 1 hour, and thereafter when the inside of the blender was maintained under a reduced pressure of 120 mm. Hg while heating at 80° C. to remove dimethylacetamide, the product began to be pulverized after 25 minutes and finely pulverized polyurethane resin containing substantially no dimethylacetamide and adapted for moulding could be obtained in 3 hours. A 10% dimethylformamide solution of this resin was colourless and transparent, and contained no insoluble substances resulting from side reaction.

EXAMPLE 8

A Werner's type mixer with a capacity of 100 lit. was charged with 17.00 kg. of polybutylene adipate having a hydroxyl value of 56.0 and an acid value of 0.2, and 3.06 kg. of 1,4-butane diol. At 50° C. the charged materials were mixed mechanically to make a homogeneous liquid mixture. When 10.80 kg. of solid 4,4'-diphenylmethane diisocyanate were added into the mixture and the mechanical mixing was continued, the reaction product became transparent and homogeneous after about 10 minutes and then the reaction system began to be muddy and the viscosity was gradually increased. 30 minutes after added diisocyanate the content reached a temperature of about 60° C. and then 45.90 kg. of dimethylformamide maintained at 60° C. were added thereto and then when the resulting mixture was continuously stirred, the product reached the saturated viscosity after about 5 hours and showed 1,200 poises. The resulting solution was dry-spun into air column maintained at 210° C. to obtain elastic yarn having a fineness of 90 deniers, a tenacity of 0.82 g./d. and an elongation of 450%.

EXAMPLE 9

Into a Werner's type mixer of a capacity of 2,000 lit. there were charged 279 kg. of polyethylene adipate having a molecular weight of 1,550, and 33.5 kg. of ethylene glycol. The mixture was mixed mechanically at 50° C. to homogenize the resulting mixture, and then 182.7 kg. of solid 4,4'-diphenylmethane diisocyanate were added thereto. The resulting mixture was continuously stirred for 45 minutes while circulating cooling water at 30° C. to obtain a whitely expanded intermediate polymer having a temperature of about 60° C., to which were further added 87 kg. of dimethylformamide and the resulting mixture was further stirred. After 30 minutes the temperature in the blender was increased to 85° C. due to the reaction heat but the product was pulverized. After pulverized, the polymerization degree was not substantially increased. When the resulting pulverized polyurethane elastomer containing dimethylformamide was diluted with further dimethylformamide by means of a separate dissolving device, said polyurethane was more easily dissolved than polyurethane obtained in the conventional bulk-polymerization to form the polymer solution having a concentration of 20% and a viscosity of 50 poises. A synthetic leather was produced by impregnating a non-woven fabric composed of polyethylene terephthalate fibres with said dimethylformamide solution of the elastomer and coagulating said impregnated non-woven fabric in a mixture of 50 parts of dimethylformamide and the same parts of water. The synthetic leather thus obtained had a good appearance and smooth contact in comparison with the one obtained from the conventional polyurethane elastomer.

EXAMPLE 10

Into a Werner's type mixer of capacity of 15 lit. there were charged 1.90 kg. of polycaprolactam having a molecular weight of about 2,000 and 0.342 kg. of 1,4-butane diol. The charged materials were mixed mechanically, at 35° C. and 1.20 kg. of solid 4,4'-diphenylmethane diisocyanate were added thereto. The reaction mixture became a transparent and homogeneous product after several minutes and after 20 minutes formed a paste-like intermediate product having an increased viscosity to which were added 1.48 kg. of diethylformamide and the resulting mixture was further stirred for 3 hours and then the jacket of the mixer was circulated with cooling water at 20° C. to obtain pulverized product.

The resulting pulverized product was diluted with diethylformamide to obtain transparent solution having a concentration of 20% and a viscosity of 50 poises, which was flown on a glass plate and then coagulated in water to obtain an elastic and strong film. The loss in weight of the elastomer in the coagulating step was small. On the other hand, where the pulverized polyurethane elastomer obtained by the same process but using methyl isobutyl ketone instead of dimethylformamide, and the polyurethane elastomer obtained by the conventional bulk-polymerization without the existence of dimethylformamide, which had a wide molecular distribution as prepared in a prior art, were used, there occurred precipitation of oligomers which instantly emulsified the coagulation bath. In this case, the loss in weight of polyurethane elastomers was high, so that satisfactory result was not obtained.

What we claim is:

1. In the process for producing pulverized elastomers by:
    (1) mechanically mixing while polymerizing to form a polyurethane (a) a polymeric diol having a molecular weight from about 400 to about 8,000, (b) a monomeric diol having a molecular weight of from 62 to about 400, and (c) an organic diisocyanate,
    (2) continuing said mechanical mixing after said polyurethane has reached a solid state, and
    (3) crushing said polyurethane to form a pulverized elastomer by continued mechanical mixing, the improvement which comprises carrying out said mechanical mixing and crushing in the presence of an amide selected from the group consisting of dialkylformamides, dialkylacetamides, N-alkyl-pyrrolidones, N - alkyl - piperidones, and N - alkyl - caprolactams wherein (i) said alkyl groups have between 1 to 5 carbon atoms and (ii) said amide is present in an amount of between about 5% to about 60%, by weight, of said diols, said diisocyanate and said amide.

2. The process of claim 1 wherein said amide is present in an amount of between 7% to 40%, by weight, of said diols, said diisocyanate and said amide.

3. The process of claim 1 wherein said amide is dimethylformamide.

4. The process of claim 1 wherein said mechanical mixing while polymerizing takes place at a temperature between room temperature and 100° C.

5. The process of claim 1 wherein said polymerizing, mechanical mixing, and crushing take place in the presence of a stabilizer wherein said stabilizer is present in an amount of between 0.01% to 30%, by weight, of said diols and said diisocyanate.

6. The process of claim 5 wherein said stabilizer is selected from the group consisting of phenol, cresol, chlorophenol, o-dichlorophenol, m-dichlorophenol, p-dichlorophenol, and trichlorophenol.

7. The process of claim 5 wherein said stabilizer is selected from the group consisting of formic acid, acetic acid, and acetic acid anhydride.

References Cited

UNITED STATES PATENTS

| 3,214,411 | 10/1965 | Saunders et al. | 260—75 |
| 3,310,533 | 3/1967 | McElroy | 260—77.5 |
| 3,312,666 | 4/1967 | Knipp et al. | 260—75 |

FOREIGN PATENTS

| 1,348,657 | 12/1963 | France. |

OTHER REFERENCES

Japanese patent publication No. 39/9097, published May 30, 1964, 7 pages of publication.

HOSEA E. TAYLOR, JR., *Primary Examiner.*

M. J. WELSH, *Assistant Examiner.*

U.S. Cl. X.R.

260—32.6, 45.95, 75, 77.5